(12) United States Patent
Feller

(10) Patent No.: US 7,568,398 B2
(45) Date of Patent: Aug. 4, 2009

(54) ULTRASONIC FLOW SENSOR WITH REPEATED TRANSMISSIONS

(76) Inventor: Murray F Feller, 21577 NW. 75th Ave. Rd., Micanopy, FL (US) 32667

( * ) Notice: Subject to any disclaimer, the term of this patent is extended or adjusted under 35 U.S.C. 154(b) by 194 days.

(21) Appl. No.: 11/868,497

(22) Filed: Oct. 7, 2007

(65) Prior Publication Data

US 2009/0090194 A1  Apr. 9, 2009

(51) Int. Cl.
*G01F 1/66* (2006.01)
(52) U.S. Cl. .................................................. 73/861.29
(58) Field of Classification Search ............. 73/861.29, 73/861.27, 861.25
See application file for complete search history.

(56) References Cited

U.S. PATENT DOCUMENTS

| | | | |
|---|---|---|---|
| 4,663,977 A | 5/1987 | Vander Heyden | |
| 5,440,936 A | 8/1995 | Spani et al. | |
| 6,098,466 A * | 8/2000 | Shkarlet | 73/861.25 |
| 6,158,288 A * | 12/2000 | Smith | 73/861.25 |
| 6,178,827 B1 * | 1/2001 | Feller | 73/861.27 |
| 6,279,379 B1 | 8/2001 | Logue et al. | |
| 6,595,071 B1 | 7/2003 | Doten | |
| 6,611,224 B1 * | 8/2003 | Nysen et al. | 342/42 |
| 2003/0200817 A1 | 10/2003 | Suginouchi et al. | |

FOREIGN PATENT DOCUMENTS

JP  58-72008 A  4/1983

OTHER PUBLICATIONS

PCT: International Search Report and ISA Written Opinion in corresponding PCT application PCT/US2008/078681, mailed Mar. 25, 2009.

* cited by examiner

*Primary Examiner*—Jewel Thompson
(74) *Attorney, Agent, or Firm*—David Kiewit

(57) ABSTRACT

A transit-time flow sensor determines a rate at which fluid flows by measuring a propagation time difference between upstream and downstream acoustic transmissions. This may involve providing an acoustic path consisting of sequentially traversed path segments and a repeating arrangement that uses the energy in a received pulse to repeat the pulse in the next sequential segment.

20 Claims, 3 Drawing Sheets

ULTRASONIC FLOW SENSOR WITH REPEATED TRANSMISSIONS

BACKGROUND OF THE INVENTION

The present invention relates to acoustic apparatus and methods for measuring the flow rate of a fluid by measuring propagation times of ultrasonic signals transmitted through the fluid.

Ultrasonic transit time flow sensors, also known as time of flight ultrasonic flow sensors, detect the acoustic propagation time difference between the upstream and downstream ultrasonic transmissions resulting from the movement of a flowing fluid, which may be a liquid or gas, and process this information to derive a fluid flow rate. Increasing the effective flow rate measurement distance along the flow axis between transducers generally provides a longer measured time interval and, correspondingly, a more precise measurement. On the other hand, size constraints and signal strength considerations motivate a designer to use smaller flow meters with a correspondingly shorter measurement distance. Therefore, there is a need for a time-of-flight flow sensor in which the effective flow rate detection distance between transducers is increased for a specified flow meter size.

BRIEF SUMMARY OF THE INVENTION

The present invention relates to apparatus and methods for measuring the flow rate of a flowing fluid using ultrasonic energy transmitted through the flowing fluid. The transducers are separated along the flow direction, and are aligned with and angled to the flow axis of the fluid. In some embodiments the transducers are in directly facing relationships so that they can communicate directly without requiring a reflector.

A preferred embodiment of the invention provides a transit time flow sensor for determining a flow rate of a fluid from a time difference between upstream and downstream acoustic transmissions. This preferred sensor comprises an acoustic path comprising a sequentially arrayed plurality of acoustic path segments in the fluid, where each segment has a respective transducer at each of its two ends. The sensor also has at least one electrical connection having a positive impedance for selectively connecting a transducer associated with one of the path segments to a transducer associated with another of the path segments so that an acoustic signal received by the transducer associated with the one of the path segments is repeated as an acoustic signal by the transducer associated with the another of the path segments. There is also a signal processing circuit electrically connected to transducers at respective ends of the acoustic path for transmitting and receiving the acoustic transmissions and for calculating the flow rate of the fluid.

An additional embodiment of the invention provides a transit time flow sensor comprising at least one pair of selectively externally connected transducers for transmitting and receiving the acoustic transmissions, where each of the selectively externally connected transducers defines a respective end of the overall acoustic path, which may consist of a number of segments. In addition to the externally connected transducers, this apparatus comprises a timer; a signal source operable under control of the timer to selectively generate an appropriate acoustic transmission from either one of the pair of selectively externally connected transducers; a switching network made up of a plurality of solid state switches operable under control of the timer to electrically connect the two transducers of the at least one pair thereof together, where the switching network does not provide any amplification; and a signal processing circuit electrically connected to the transducers of the at least one pair thereof for generating and receiving the acoustic transmissions and for calculating the flow rate of the fluid.

Another preferred embodiment of the invention provides a transit time flow sensor where the acoustic path comprises a plurality of discrete, non-contiguous segments. In this embodiment the sensor comprises at least one pair of externally connected transducers for transmitting and receiving the acoustic transmissions, where each of the at least one pair of transducers defines a respective end of the acoustic path. In addition, the apparatus comprises a signal source to selectively generate, from at least one of the at least one pair of externally connected transducers, the acoustic transmission; and at least one reactive pair of directly electrically connected transducers. In the 'reactive pair', the two transducers making up the pair are directly electrically connected, and each transducer defines a respective end of a respective segment of the acoustic path. In addition, this embodiment comprises a signal processing circuit selectively electrically connected to the externally connected transducers for generating and receiving the acoustic transmissions and for calculating the flow rate of the fluid.

Yet another aspect of the invention is that it provides a transit-time method of determining a rate at which fluid flows through a pipe wherein an ultrasonic signal is directed along a path comprising a serial string of non-contiguous segments. In each of the path segments, the ultrasonic signal is generated by a transducer at one end and received by a transducer at the other end. Although the acoustic signal may be redirected or regenerated and retransmitted several times during each measurement cycle, the method does not provide for intermediate stages of amplification.

A further aspect of the invention is that it provides a transit-time method of determining a rate at which fluid flows by measuring a propagation time difference between upstream and downstream acoustic transmissions. This method involves providing an acoustic path consisting of sequentially traversed path segments, each of which has a respective transducer located at each of its two ends. An acoustic pulse is generated at a first end of a selected path segment and received at the second end of the selected acoustic path segment. The energy contained in the received pulse is then used to generate another acoustic pulse in a sequentially related path segment. The steps of generating, receiving and repeating are used to pass an acoustic transmission from one end of the acoustic path to the other end so that a suitable signal processing circuit can determine the rate at which fluid flows from the measured times of flight.

In one embodiment, the method employs a switching network having a positive impedance to repeatedly transmit a signal along a path segment lying between two externally connected transducers. In another embodiment, the method employs one or more reactive pairs of transducers that are directly connected to each other. These transducers are arranged along the path so that a selectively externally connected transducer is disposed at a respective end of the overall path and so that each reactive pair is disposed between two of the path segments. This ensures that each of its transducers is at the end of a different one of the path segments. To make a measurement according to this method, one electrically energizes one of the externally connectable transducers by means of the signal source to generate an acoustic transmission which is then sequentially received and regenerated by each of reactive pair of transducers so that the acoustic transmission traverses all of the path segments. The acoustic transmission is then received at the second one of the externally connectable transducers. The rate at which the fluid flows is a function of the time of flight of the acoustic transmission summed along all the path segments.

Although it is believed that the foregoing description may be of use to one who is skilled in the art and wishes to learn how to practice the invention, it will be recognized that the foregoing recital is not intended to list all the features and advantages. Those skilled in the art will appreciate that they may readily use both the underlying ideas and the specific embodiments disclosed in the in the following Detailed description as a basis for designing other arrangements to achieve the same purposes of the present invention and that such equivalent constructions are within the spirit and scope of the invention in its broadest form. Moreover, it may be noted that different embodiments of the invention may provide various combinations of the recited features and advantages of the invention, and that less than all of the recited features and advantages may be provided by some embodiments.

DETAILED DESCRIPTION OF PREFERRED EMBODIMENTS

Figure 1:
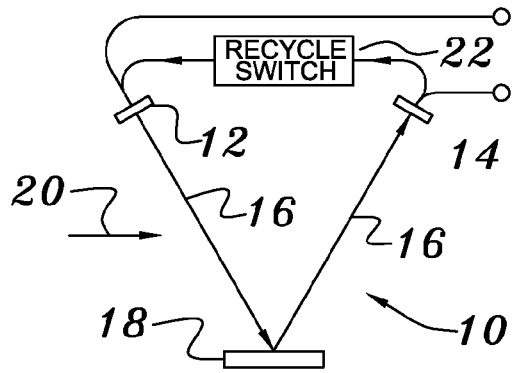
FIG. 1 is a schematic depiction of an embodiment of the invention employing a passive reflector.

Turning now to FIG. 1, one finds a schematic representation of a portion of an ultrasonic transit time flow sensor 10 comprising two transducers 12, 14 positioned to communicate with each other along an acoustic propagation path shown with arrowed lines 16. In this embodiment the path involves reflection from a reflector 18 that may be a wall of a pipe (for an in-line flow meter) or a component of a probe. The direction of flow of fluid is indicated with an arrow 20.

The reader who is familiar with the transit time flow measurement art will recognize that if the schematic box labeled "recycle switch" 22 were removed, FIG. 1 would depict a configuration familiar in the prior art. In this prior art flow meter the downstream acoustic transmissions are generated with one 12 of the two depicted transducers and received by the other 14. The function of the transducers would, of course, be reversed for the upstream transmissions. Those skilled in the flow measurement arts will recognize that one can elect to either generate the upstream and downstream pulses sequentially or in unison.

Figure 7:
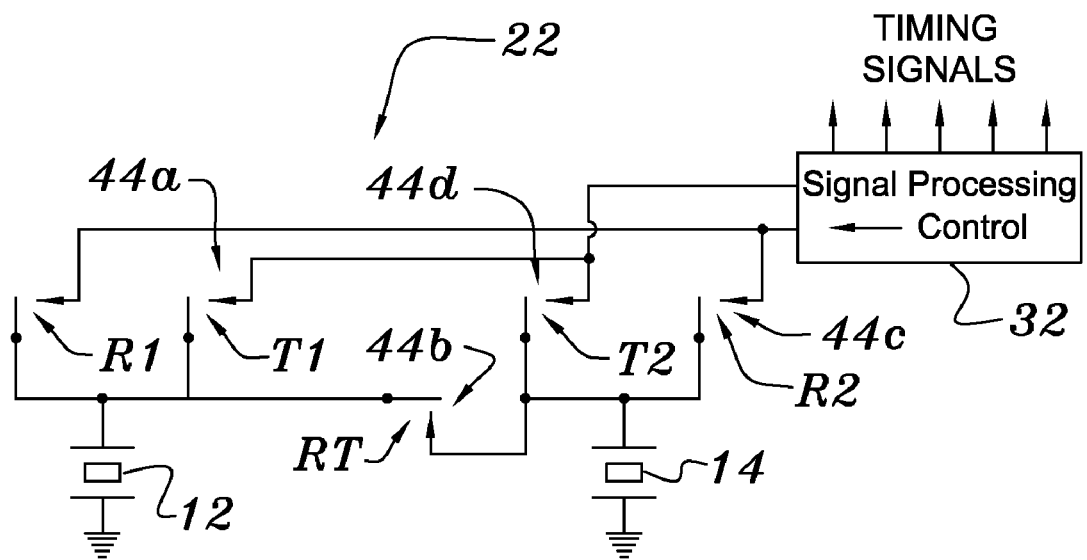
FIG. 7 is a schematic circuit diagram of a recycling switch used in some embodiments of the invention.

The embodiment of the invention depicted in FIG. 1 also comprises a 'recycle switch' 22 network, an embodiment of which is schematically depicted in FIG. 7, that functions to allow the acoustic path segment 16 to be traversed at least twice, thereby at least doubling the overall acoustic path length and correspondingly increasing the precision of measurement. In this embodiment, after a pulse is generated by one of the transducers 12, 14 the recycle switch 22 connects the two transducers 12, 14 together so that when the pulse arrives at the receiving transducer 14, 12 it is redirected back to the transducer that originally generated it, which uses the energy from that pulse to generate a second acoustic pulse that follows the same path as the first one did. Because there is no amplification provided in the recycle switch network, the amplitude of the second pulse is lower than that of the first one. Thus, if this recycling process is repeated several times, eventually the amplitude of a received pulse will be too small to be detected.

Figure 2:
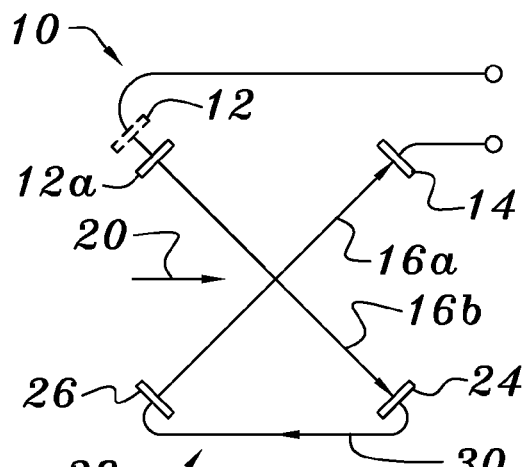
FIG. 2 is a schematic depiction of an embodiment of the invention employing a reactive pair of transducers.
Figure 4:
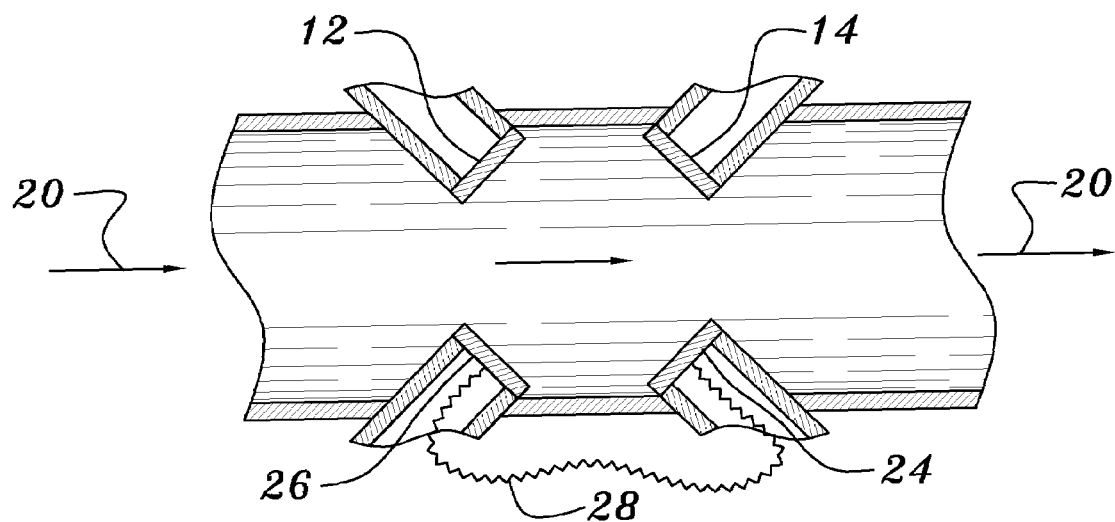
FIG. 4 is a partially schematic longitudinal cross-section through an in-line flow sensor of the invention that employs a single reactive pair of transducers and a single externally connected pair of transducers. In the interest of clarity of presentation, all four transducers are shown as being in the same plane. Those skilled in the flow measurement arts will recognize that many other settings are possible.

Turning now to FIG. 2 and FIG. 4, one finds schematic depictions of another embodiment of the invention. In this embodiment acoustic signals are generated and received by means of a pair of transducers 12, 14, each of which is connected to an output of a direction switch 40 used to selectively connect it to a transmitter 36 or receiver 38. Each of the selectively externally connected transducers 12, 14 is at one end of a path segment and in a facing arrangement with another transducer 24, 26 at the opposite end of the same path segment. The transducers facing the externally connected ones comprise a reactive pair 28 that are permanently directly electrically connected to each other. This connection 30 is usually by metal wires, but may be of any sort that has a positive impedance, however low. In the operation of the embodiment depicted in FIG. 2, a carrier burst generated at a first of the externally connected transducers 12 is received at the other end of the first path segment 16*a* by one 24 of the reactive pair 28 of transducers and is repeated by the other member 26 of the reactive pair so that the carrier burst can traverse the second acoustic path 16*b* segment and be received by the second of the externally connected transducers 14.

Figure 5:
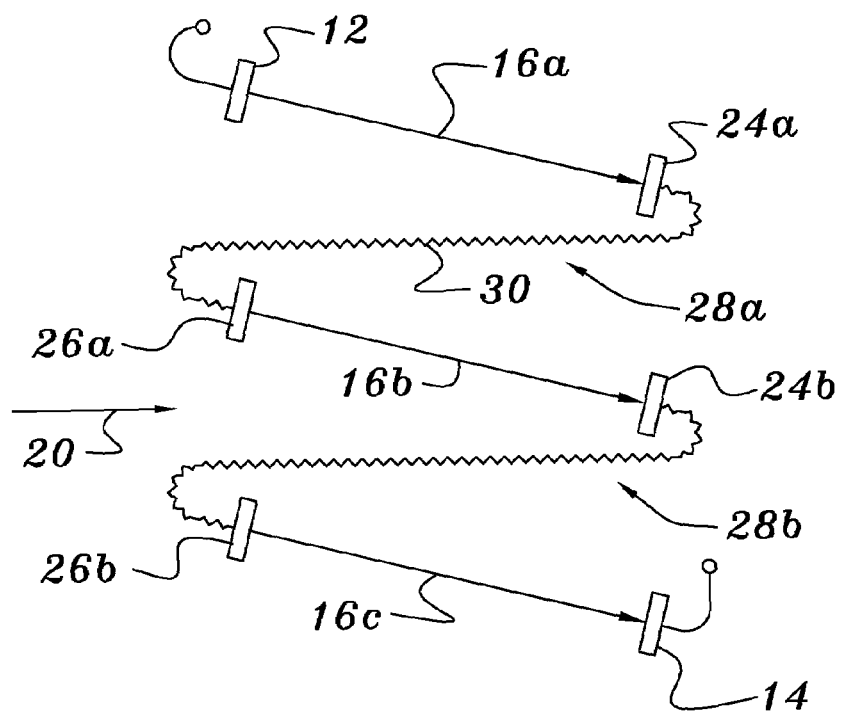
FIG. 5 is a schematic depiction of an array of transducers usable in an in-line flow meter incorporating a single externally connected pair of transducers and two reactive pairs of transducers for a total of six transducers.

It will be recognized that arrangements for repeating the acoustic signal are not limited to a single repetition. As noted above with respect to the embodiment of FIG. 1, the combination of a single pair of transducers 12, 14, a reflector 18, and a recycle switch 22 can be used for multiple transmissions along a path segment 16. Correspondingly, one can configure a flow meter comprising multiple reactive pairs 28 of transducers to allow for multiply repeated signals. FIG. 5, for example, is a highly schematic depiction a portion of a transit time flow meter having an acoustic path having three path segments 16*a*, 16*b*, 16*c* and two reactive pairs 28*a*, 28*b*. It may be noted that in an in-line flow meter made this way the three upstream transducers 12, 26*a*, 26*b* might be equiangularly spaced around the inside of one end of the in-line meter and the three downstream transducers 24*a*, 24*b*, 14 might be equiangularly spaced around the other end, probably with different angular settings, with the three flow segments 16*a*, 16*b*, 16*c* sampling different portions of the flowing fluid. This relationship might be visualized as being generated by taking the depiction of FIG. 5, rolling it about a cylinder and then twisting the cylinder about its axis. This is a difficult geometrical arrangement to visualize or to draw. Hence, in the interest of clarity of presentation, the transducer array is shown as being more or less unrolled and laid out in the plane of the drawing.

Figure 3:
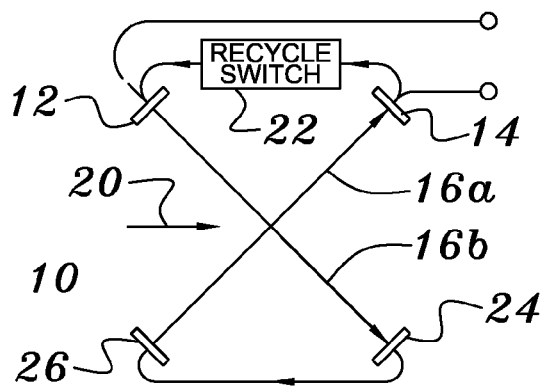
FIG. 3 is a schematic depiction of an embodiment of the invention employing both a passive reflector and a reactive pair of transducers.

One can use both a recycle switch 22 and at least one reactive pair 28 of transducers in a single sensor, as is schematically depicted in FIG. 3. In this embodiment a downstream pulse is created by one of the selectively externally connected transducers 12; is detected by a transducer that faces it 24 and that is a member of a reactive pair 28. The pulse is repeated by the other 26 of the reactive pair and detected by the second selectively externally connected transducer 14 (that is, by this time in the operating cycle, disconnected from the signal generation and processing circuitry 32 and connected to the first selectively externally connected transducer which is also disconnected from the external circuitry). The pulse is then again repeated by the first selectively externally connected transducer 12. Following this repetition the acoustic transmission again traverses the acoustic path and is detected by the second selectively externally connected transducer 14 as an electric signal input to the signal processing circuitry 32. Tests have shown that either recycle switch arrangement depicted in FIG. 1, the multiple reactive pair arrangement of FIG. 5, or a combination of the two can provide at least two repetitions before the acoustic signal becomes too weak for reliable detection.

The foregoing discussion describes several embodiments of the invention in which an acoustic signal is repeated so that it can traverse a segmented overall acoustic path 16. In some cases (e.g., FIG. 1) the segmented path 16 comprises a single physical path that the signal traverses more than once. In other cases (e.g., FIG. 2) the path 16 comprises a plurality of physically distinct segments 16a, 16b, each of which is traversed once by the acoustic transmission. In yet other cases, (e.g., FIG. 3) the acoustic path comprises physically distinct segments 16a, 16b, each of which is traversed more than once. That is, the transmission process is inherently sequential but may or may not involve physically distinct path segments. In reading this disclosure, the reader will understand that when terms such as a "sequentially arrayed plurality of acoustic path segments" are encountered, although the sequence is inherently temporal, the 'plurality' referred to may be spatial, temporal, or any combination of the two.

Figure 6:
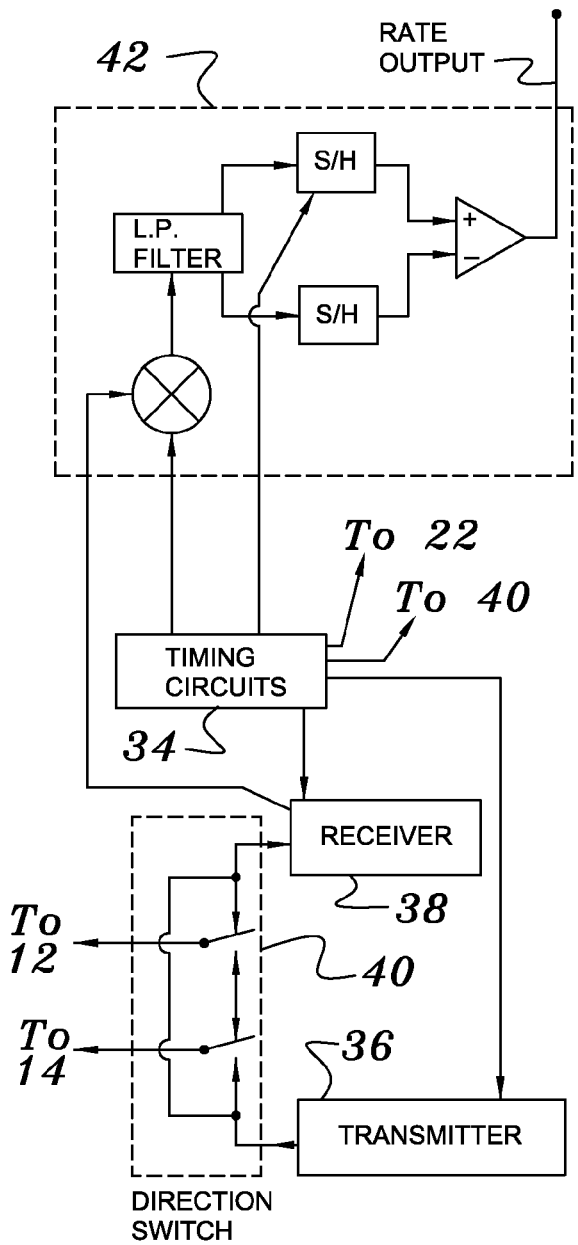
FIG. 6 is a schematic circuit diagram of a control and signal processing circuit.

Turning now to FIG. 6, one finds an exemplar signal processing and control circuit 32 usable with various embodiments of the invention. Timing circuits 34 control operation of a burst transmitter 36 and receiver 38 and of a direction switch 40 used to alternately provide an upstream and a downstream acoustic transmission. The timing circuits 34 also optionally control a recycle switch 22, and provide a timing input to the signal processing portion 42 of the circuitry.

As mentioned above, prior art transit time flow meters are sometimes arranged to have both the upstream and downstream acoustic transmissions generated sequentially, and sometimes are designed for simultaneous transmissions in both directions. The latter approach allows for a more direct comparison of the time difference between the upstream and downstream transmissions and is thus sometimes preferred. In the embodiments of the present invention employing a reactive pair of transducers, a straightforward application of the simultaneous transmission approach can lead to a problem if the pulses received by the two transducers of the reactive pair overlap, which would lead to a deleterious linear summing of the two pulses. If the pulses do not overlap, however, this problem does not arise. Hence, preferred embodiments of the present invention using a reactive pair and simultaneous transmission are configured so that the physical lengths of various path segments differ. In FIG. 2, for example, this is done by moving one of the transducers 12a inwardly from a position that it would occupy if the physical path segments were of equal length. It will be recognized that other approaches to changing the effective path length can be used. These include, without limit, translating one of the transducers perpendicular to the flow direction and changing its angular orientation so that it remains aimed at whatever transducer is at the other end of its acoustic path segment.

Figure 8:
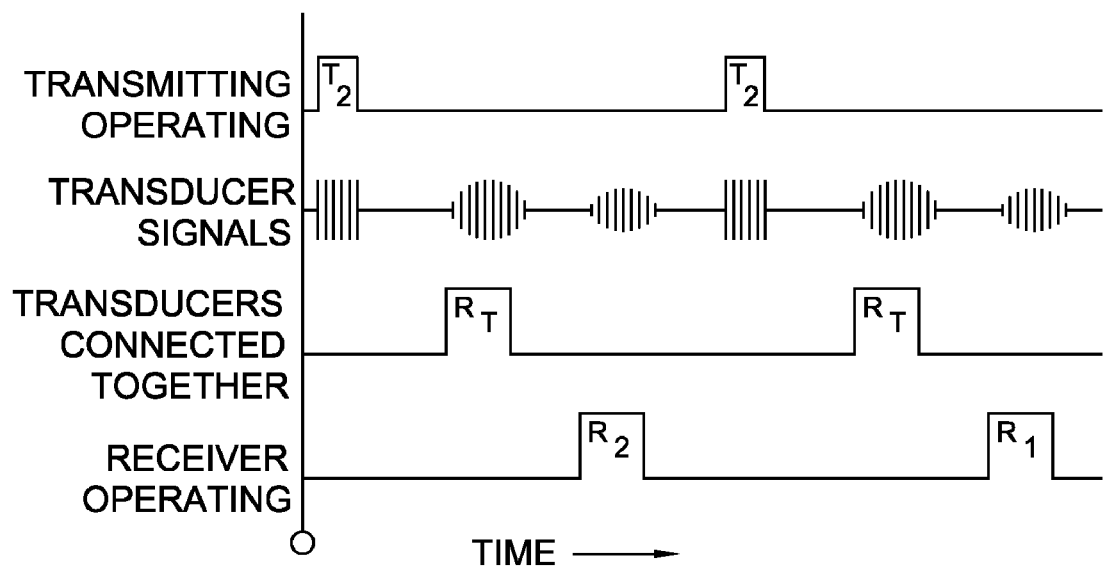
FIG. 8 is a timing diagram depicting operation of the circuit of FIG. 7.

Turning now to FIG. 7 one finds a schematic depiction of a switching network combining the recycle switch 22 and direction switch 40 functions discussed above. A sequence of timing pulses from the signal processing and control circuit 32 are applied to electrically controlled switches, which may conveniently be MOSFET transistors or other solid state switches, to sequentially generate and receive upstream and downstream transmissions, as depicted by the associated timing diagram of FIG. 8, where time windows T1, T2, RT, R1, R2 correspond to timing signals shown in FIG. 7. At an initial instant in the cycle, T1, a timing signal causes a switch 44a to close so that a first 12 of two selectively externally connected transducers can receive an electrical carrier burst from the transmitter 36. This switch is then opened and another switch 44b, which provides the recycle function, is closed for an interval labeled RT to connect the first and second transducers together during a time window in which the acoustic transmission is expected to arrive at the second transducer 14. This received transmission is repeated by the first transducer. At the conclusion of the RT time window the switch 44b is opened and, at a later time R2, at which the repeated transmission is expected to arrive at the second selectively externally connected transducer 14, another switch 44c is closed to connect the second transducer 14 to the signal processing circuits 42. This sequence of events is then repeated with the functions of the first and second transducers interchanged in order to measure the transit time in the reverse direction. One may provide the same functionality with respect to the RT interval by closing switches 44a and 44d simultaneously and not having the openable switch indicated as 44b.

Although the immediately foregoing discussion involved only the two selectively externally connected transducers, it will be recognized that the presence of repeating pairs in a measurement configuration affects only the expected time intervals between switch closures. That is, there are no external electrical connections to transducers in a repeating pair, so their presence or absence does not affect the circuit topology.

Although the present invention has been described with respect to several preferred embodiments, many modifications and alterations can be made without departing from the invention. Accordingly it is intended that all such modifications and alterations be considered as within the spirit and scope of the invention as defined in the attached claims.

The invention claimed is:

1. A transit time flow sensor for determining a flow rate of a fluid from a time difference between upstream and downstream acoustic transmissions, the sensor comprising:
   an acoustic path comprising a sequentially arrayed plurality of acoustic path segments in the fluid, each segment having a respective transducer at each of its two ends;
   at least one electrical connection having a positive impedance for selectively connecting a transducer associated with one of the path segments to a transducer associated with another of the path segments so that an acoustic signal received by the transducer associated with the one of the path segments is repeated as an acoustic signal by the transducer associated with the another of the path segments; and a signal processing circuit selectively electrically connected to transducers at respective ends of the acoustic path for generating and receiving the acoustic transmissions and for calculating the flow rate of the fluid.

2. The flow sensor of claim 1 wherein the electrical connection having a positive impedance comprises a switching network comprising a plurality of solid state switches operable to selectively electrically connect the transducers at respective ends of the acoustic path at selected times.

3. The flow sensor of claim 1 wherein the electrical connection having a positive impedance comprises a direct electrical connection.

4. The flow sensor of claim 1 wherein at least one of the acoustic path segments comprises a reflector.

5. The flow sensor of claim 1 wherein the acoustic path comprises at least one path segment that is traversed at least twice by each transmission.

6. A transit-time method of determining a rate at which fluid flows by measuring a propagation time difference between upstream and downstream acoustic transmissions, the method comprising the steps of:
   providing an acoustic path consisting of sequentially traversed path segments, each path segment having a respective transducer located at each of its two ends;
   generating an acoustic pulse at at least a first end of a selected path segment;
   receiving the acoustic pulse at the second end of the selected path segment;
   using the energy contained in the received pulse to generate another acoustic pulse in a sequentially related path segment;
   repeating the generating, receiving and using steps so as to pass an acoustic transmission from one end of the acoustic path to the other; and
   determining from the time of flight of the acoustic transmission, by means of a signal processing circuit, the rate at which the fluid flows.

7. The method of claim 6 further comprising generating a second acoustic transmission that traverses all of the path segments in the reverse order.

8. The method of claim 6 wherein the path comprises at least three segments.

9. The method of claim 6 wherein the energy contained in the received pulse is conveyed to a sequentially related transducer by means of a switching network that does not provide amplification.

10. The method of claim 6 wherein the energy contained in the received pulse is conveyed to a sequentially related transducer by a pair of metallic conductors directly electrically connecting the two transducers in a respective reactive pair thereof.

11. The method of claim 6 wherein the plurality of sequentially traversed path segments comprises a single segment that is traversed repeatedly.

12. The method of claim 6 wherein the plurality of sequentially traversed path segments comprises a plurality of physically distinct segments, each of which is traversed at least once.

13. The method of claim 6 wherein the step of generating comprises simultaneously generating an acoustic pulse at both ends of the acoustic path.

14. A transit-time method of determining a rate at which fluid flows by measuring a propagation time difference between upstream and downstream acoustic transmissions, the method comprising the steps of
   a) providing an acoustic path consisting of sequentially traversed path segments, the segments comprising at least a pair of segments in which a transducer associated with a first of the pair of segments is selectively electrically connected to a transducer associated with the second of the pair of segments through a positive electrical impedance;
   b) propagating the upstream and downstream acoustic transmissions along the plurality of path segments in respective selected sequences so that each of the acoustic transmissions is repeated through the positive electrical impedance at least once; and
   c) measuring, by means of a signal processing circuit, the difference between the upstream and downstream transmission times to determine the flow rate.

15. The method of claim 14 wherein the positive impedance comprises a direct electrical connection.

16. The method of claim 14 wherein the positive impedance comprises a switching network.

17. The method of claim 14 wherein the plurality of sequentially traversed path segments comprises a single segment that is traversed repeatedly.

18. The method of claim 14 wherein the plurality of sequentially traversed path segments comprises a plurality of physically discrete segments, each of which is traversed at least once.

19. The method of claim 14 wherein the step of propagating the upstream and downstream transmissions comprises generating one of the two transmissions and, after that transmission is received at the other end of the overall acoustic path, generating the other of the two transmissions.

20. The method of claim 14 wherein the step of propagating the upstream and downstream transmissions comprises simultaneously generating both the upstream and the downstream transmissions.

* * * * *